(12) United States Patent
Hirose et al.

(10) Patent No.: US 12,076,745 B2
(45) Date of Patent: Sep. 3, 2024

(54) WINDING APPARATUS, SPINNING APPARATUS, AND METHOD OF WINDING BELT-SHAPED STRUCTURE

(71) Applicant: KABUSHIKI KAISHA TOSHIBA, Tokyo (JP)

(72) Inventors: Shiori Hirose, Yokohama (JP); Masahiro Tokoh, Yokohama (JP); Kenichi Ooshiro, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/870,111

(22) Filed: Jul. 21, 2022

(65) Prior Publication Data

US 2023/0050905 A1 Feb. 16, 2023

(30) Foreign Application Priority Data

Aug. 12, 2021 (JP) .................. 2021-131648

(51) Int. Cl.
*B05C 13/00* (2006.01)
*B05C 5/02* (2006.01)
*B05C 11/00* (2006.01)

(52) U.S. Cl.
CPC .............. *B05C 13/00* (2013.01); *B05C 5/025* (2013.01); *B05C 11/00* (2013.01)

(58) Field of Classification Search
USPC .... 118/665, 62, 65, 679–682, 692, 672–673, 118/677; 29/623.5
See application file for complete search history.

(56) References Cited

U.S. PATENT DOCUMENTS

| 5,435,054 A | * | 7/1995 | Tonder | ................ | H01M 10/052 |
| | | | | | 29/623.5 |
| 9,916,927 B1 | * | 3/2018 | Kandel | ................. | H01F 41/127 |
| 2002/0197535 A1 | * | 12/2002 | Dudley | ............... | H01M 10/052 |
| | | | | | 427/407.1 |

FOREIGN PATENT DOCUMENTS

| JP | 2003136007 A | * | 5/2003 |
| JP | 2013-091869 A | | 5/2013 |
| JP | 2018-150642 A | | 9/2018 |
| JP | 2020-020071 A | | 2/2020 |
| KR | 10-2011-0058011 | | 6/2011 |

OTHER PUBLICATIONS

English Translation JP2003136007A (Year: 2003).*
Korean Office Action issued Apr. 19, 2024, in Korean Patent Application No. 10-2022-0097302, 7 pages (with English Machine Translation).

* cited by examiner

*Primary Examiner* — Yewebdar T Tadesse
(74) *Attorney, Agent, or Firm* — Oblon, McClelland, Maier & Neustadt, L.L.P.

(57) ABSTRACT

According to an embodiment, a winding apparatus includes a winding core and an air flow controller. The winding core winds a belt-shaped structure comprising a substrate and an edge-coating part that covers an edge of a substrate in a width direction, the edge-coating part being coated with a material liquid on a surface of the substrate. The air flow controller has a nozzle that performs at least either ejection or suction of a gas, and adjusts an air flow in the vicinity of the edge-coating part of the film of the belt-shaped structure, which is wound by a winding core.

4 Claims, 9 Drawing Sheets

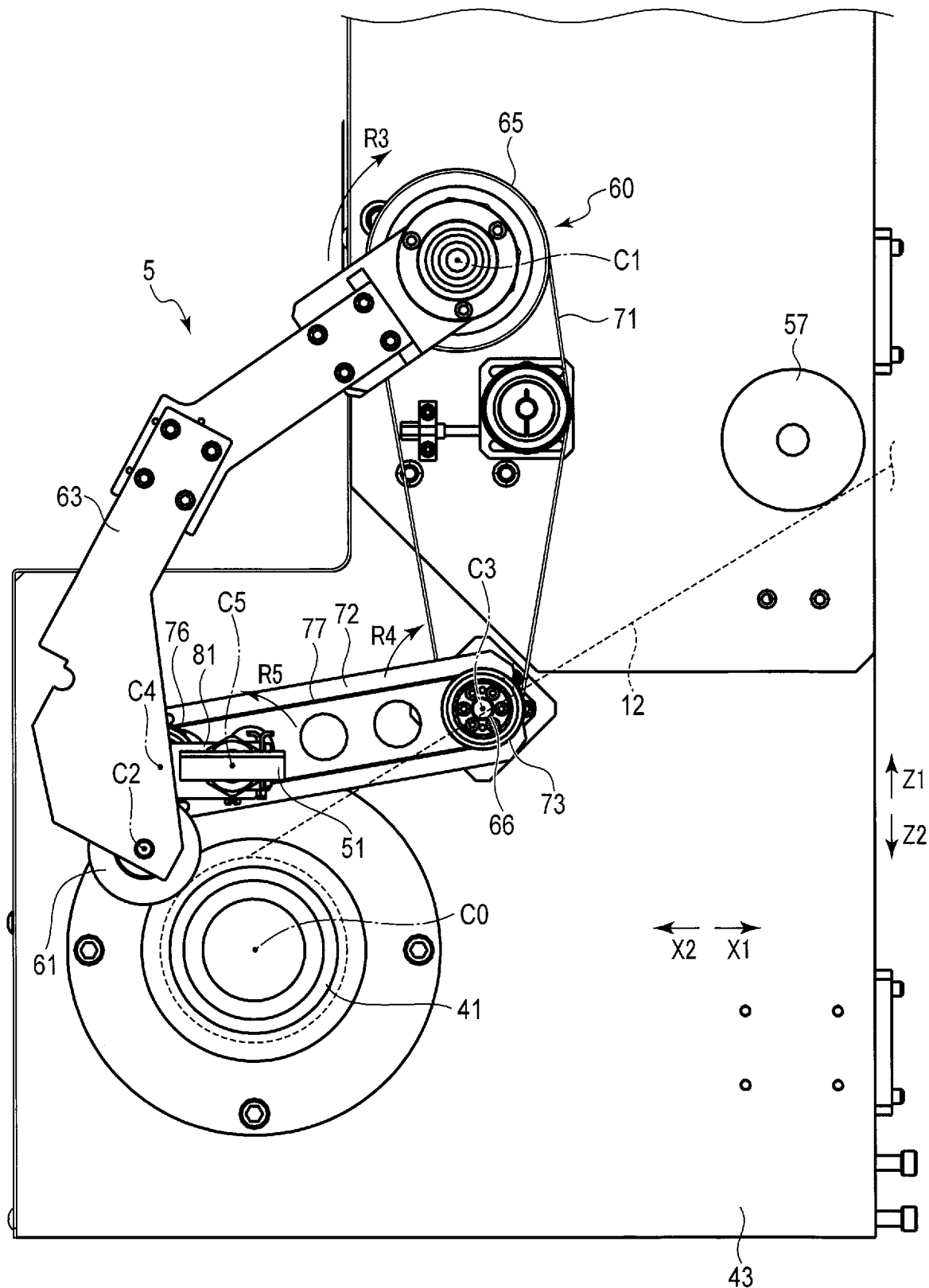
F I G. 5

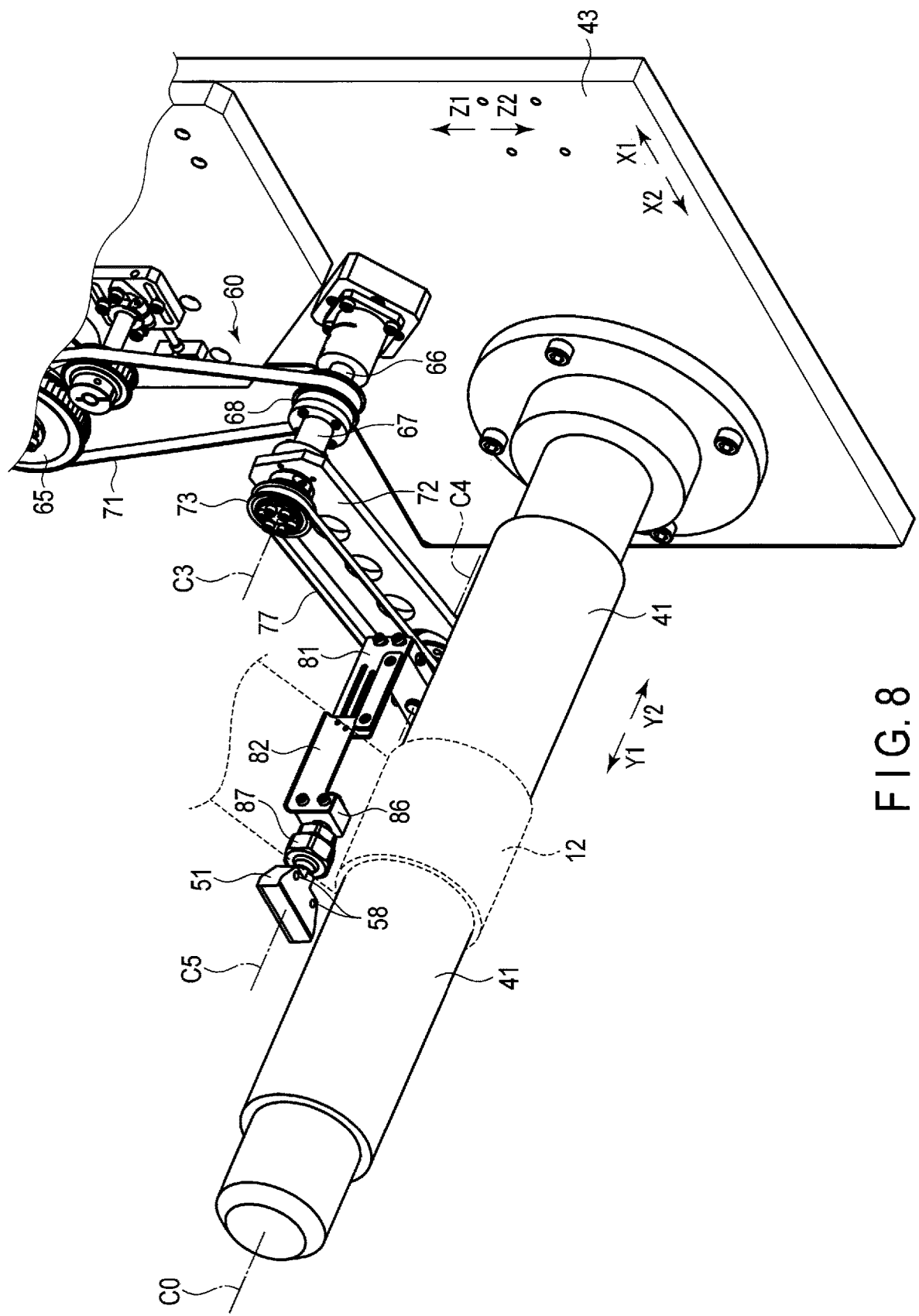
F I G. 8

WINDING APPARATUS, SPINNING APPARATUS, AND METHOD OF WINDING BELT-SHAPED STRUCTURE

CROSS-REFERENCE TO RELATED APPLICATIONS

This application is based upon and claims the benefit of priority from Japanese Patent Application No. 2021-131648, filed Aug. 12, 2021, the entire contents of which are incorporated herein by reference.

FIELD

Embodiments described herein relate to a winding apparatus, a spinning apparatus, and a method of winding a belt-shaped structure.

BACKGROUND

A manufacturing method for forming an organic fiber film on a surface of a substrate by ejecting a raw material liquid in which an organic material is dissolved in a solvent onto the surface of the substrate by an electrospinning method, etc. is widely known. For example, in an electrode group of a battery, a separator insulating between a positive electrode and a negative electrode may be formed integrally with the positive electrode or the negative electrode. In this case, an organic fiber film is formed by an electrospinning method, etc. on a surface of the electrode (positive electrode or negative electrode) formed integrally with the separator, and the film serves as the separator. A band-shaped structure, which is obtained by forming the film on the substrate as described above, is wound around a winding core.

For example, if an electrode integrally formed with a separator is formed as a band-shaped structure, from the view point of preventing a short circuit, one side edge of the electrode, which serves as a substrate, in a width direction is covered by an edge-coating part of the film, and the edge-coating part of the film protrudes from the edge of the substrate toward the outside in the width direction of the band-shaped structure. Thus, in the task of winding a band-shaped structure in which an edge-coating part is formed in the film around a winding core, it is desired to suppress mismatching due to bends of the edge-coating part of the film onto the outer peripheral side of the winding core and folds of the edge-coating part of the film to the inner side of the width direction of the band-shaped structure (the axis direction of the winding core). By suppressing the occurrence of such bends and folds in the edge-coating part of the film, it is further desired to suppress mismatching due to occurrence of local lumps in the edge-coating part of the film and the vicinity thereof in the wound part of the band-shaped structure around the winding core.

BRIEF DESCRIPTION OF THE DRAWINGS

FIG. 5 is a plan view of the winding core, the nozzle, and the vicinity thereof in the winding unit according to the first embodiment, viewed from one side of a transverse direction.

FIG. 8 is a perspective view of the winding core, the nozzle, and the part in the vicinity of the nozzle in the drive force transmitting unit in the winding unit according to the first embodiment.

DETAILED DESCRIPTION

According to an embodiment, a winding apparatus includes a winding core and an air flow controller. The winding core winds a belt-shaped structure comprising a substrate and an edge-coating part that covers an edge of a substrate in a width direction, the edge-coating part being coated with a material liquid on a surface of the substrate. The air flow controller has a nozzle that performs at least either ejection or suction of a gas, and adjusts an air flow in the vicinity of the edge-coating part of the film of the belt-shaped structure, which is wound by a winding core.

Hereinafter, the embodiments will be described with reference to the accompanying drawings.

First Embodiment

Figure 1:
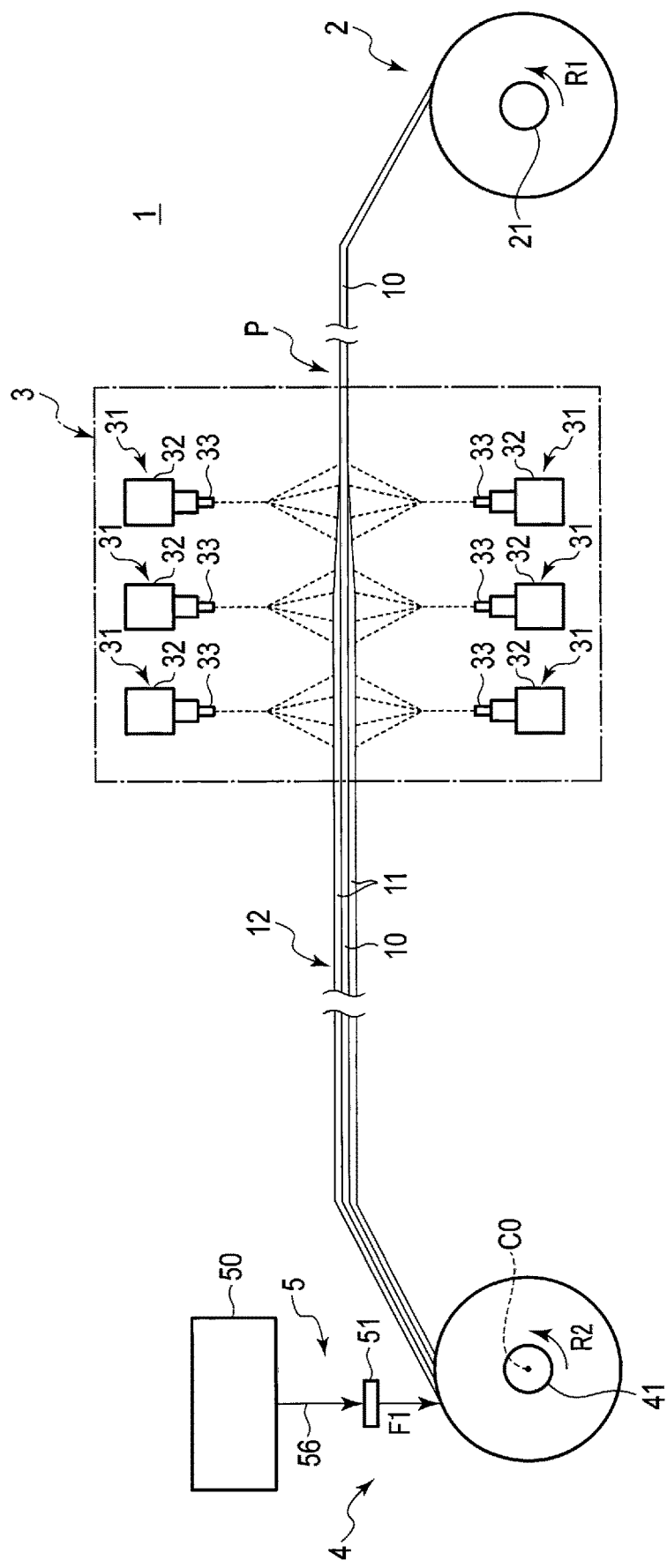
FIG. 1 is a schematic diagram showing a spinning apparatus according to a first embodiment.

FIG. 1 is a schematic diagram showing an example of a spinning apparatus 1 according to the first embodiment. As shown in FIG. 1, the spinning apparatus 1 includes a delivery unit 2, a spinning unit 3, a winding unit 4 which serves as a winding apparatus, and a transfer path P. The transfer path P extends from the delivery unit 2 to the winding unit 4 via the spinning unit 3. In the spinning apparatus 1, the substrate 10 is transferred from the delivery unit 2 to the winding unit 4, via the transfer path P.

In the transfer path P, the direction of transferring the substrate 1, namely the direction toward the winding unit 4, is a downstream side. The direction opposite to the transfer direction, namely the direction toward the delivery unit 2, is an upstream side of the transfer path P. In the transfer path P, the first direction, which is a width direction intersecting (perpendicular or substantially perpendicular to) the transfer direction and the second direction intersecting (perpendicular or substantially perpendicular to) both the transfer direction and the first direction are defined. In FIG. 1, the first direction (width direction) of the transfer path P corresponds to, or substantially corresponds to, a direction perpendicular to the sheet of the drawing.

The transfer path P may be provided with one or more guiding rollers (not shown) for guiding the substrate 10 from the delivery unit 2 to the winding unit 4. In this case, in the transfer path P, one or more guiding rollers are arranged at least between the delivery unit 2 and the spinning unit 3 or between the spinning unit 3 and the winding unit 4. The guiding roller may be arranged inside the spinning unit 3.

The state of extension of the transfer path P from the delivery unit 2 to the winding unit 4 is not particularly limited. The transfer path P extends along the horizontal direction in one example, and the transfer path P extends along vertical direction in another example. One or more bent or folded parts of the transfer path P are provided between the delivery unit 2 and the winding unit 4, and in these bent or folded parts, the extending direction of the transfer path P may be changed. In one example, a folded part of the transfer path P is provided in at least one of between the delivery unit 2 and the spinning unit 3 or between the spinning unit 3 and the winding unit 4, and in another example, a folded part of the transfer part P is provided at the inside of the spinning unit 3.

In the substrate 10, a longitudinal direction, a width direction intersecting (perpendicular or substantially perpendicular to) the longitudinal direction, and a thickness direction intersecting (perpendicular or substantially perpendicular to) both the longitudinal direction and the width direction are defined. In the substrate 10, a dimension along a width direction (a width) is smaller than a dimension along a longitudinal direction, and a dimension along a thickness direction is smaller than a dimension along a width direction.

The delivery unit 2 includes a delivery core 21. The delivery core 21 is constituted by a reel, for example. The delivery core 21 has a central axis, and a substrate 10 is wound around the delivery core 21 into a roll. The direction along the central axis of the delivery core 21 corresponds to, or approximately corresponds to, a first direction of the transfer path P (a width direction). The substrate 10 is wound around the delivery core 21, in a state where the width direction of the substrate 10 corresponding to, or approximately corresponding to, a direction along the central axis of the delivery core 21 and where the longitudinal direction of the substrate 10 is along a circumferential direction of the delivery core 21. In the delivery unit 2, the delivery core 21 is rotated in the direction of Arrow R1 by driving a driving member (not shown) such as a motor; as a result, the substrate 10 is delivered and supplied to the transfer path P.

In the transfer path P, the substrate 10 delivered from the delivery unit 2 is transferred toward the winding unit 4. The substrate 10 is transferred in a state where the width direction of the substrate 10 corresponds to, or substantially corresponds to, a first direction (width direction) of the transfer path P and the thickness direction of the substrate 10 corresponds to or, substantially corresponds to, a second direction of the transfer path P. In FIG. 1, the width direction of the substrate 10 corresponds to, or substantially corresponds to, a direction perpendicular to the sheet of the drawing.

The spinning unit 3 forms a film 11 made of organic fiber on the surface of the substrate 1, which is transferred on the transfer path P. The band-shaped structure 12 that includes the substrate 10 and the film 11 is formed. Similarly to the substrate 10, a longitudinal direction, a width direction, and a thickness direction are defined in the band-shaped structure 12. The spinning unit 3 includes one or more spinning heads 31, and in the example of FIG. 1, six spinning heads 31 are provided in the spinning unit 3. Each of the spinning heads 31 includes a head main body 32 and an ejection nozzles 33 projecting from the head main body. Each spinning head 31 is capable of keeping, in the head main body 32, a material liquid in which an organic substance is dissolved in a solvent.

In each spinning head 31, the material liquid kept in the inside of the head main body 32 is ejected from the ejection nozzle 33 against the substrate 10. The substrate 10 is transferred, passing on the side against which a material liquid is ejected, with respect to each spinning head 31. In each spinning head 31, a single ejection nozzle 33 or multiple ejection nozzles 33 may be provided. In one example, a plurality of ejection nozzles 33 are provided in each spinning head 31, and in each spinning head 31, a nozzle row in which the ejection nozzles 33 are arrayed in a first direction of the transfer path P (the direction perpendicular to, or approximately perpendicular to, the sheet of FIG. 1).

In the spinning unit 3, a power supply source (not shown) is provided. In one example, the power supply source is a DC power supply source. In the spinning unit 3, the power supply source applies a voltage to the spinning heads 31 so as to generate an electric potential difference between the substrate 10 transferred on the transfer path P and each ejection nozzle 33. Then, the material liquid electrified by the application of the voltage to the ejection nozzles 33 is ejected from each ejection nozzle 33 against the substrate 10 and a film 11 is thereby formed on the surface of the substrate 10. The material liquid may be electrified in a positive polarity or a negative polarity.

As an organic substance used in a material liquid, one or more is selected from, for example, polyolefin, polyether, polyimide, polyketon, polysulfon, cellulose, polyvinyl alcohol, polyamide, polyamideimide, and polyvinylidene fluoride. Polyolefin is for example polypropylene or polyethylene.

The voltage between the ejection nozzle 33 of each spinning head 31 and the substrate 10 is set as appropriate according to types of a solvent and a dissolved substance in a material liquid, a boiling point and a vapor pressure curve of a solvent of a liquid material, a concentration and a temperature of a material liquid, a shape of the ejection nozzle 33, and a distance between the substrate 10 and the ejection nozzle 33, and the like. In one example, a voltage (electric potential difference) applied between the ejection nozzle 33 of each spinning head 31 and the substrate 10 is set between 1 kV and 100 kV as appropriate. The ejection speed of the material liquid from the ejection nozzle 33 of each spinning head 31 corresponds to a concentration, a viscosity, and a temperature of the material liquid, a voltage applied between the ejection nozzle 33 of each spinning head 31 and the substrate 10, and a shape of the ejection nozzle 33, and the like.

As explained above, the spinning unit 3 according to the present embodiment forms a film 11 made of organic fiber on the surface of the substrate 10 with an electrospinning method (sometimes called "electric charge induction spinning method"), and forms a band-shaped structure 12 including the substrate 10 and the film 11. In the example of FIG. 1, a material liquid is ejected on both surfaces of the substrate 10; in another example, on the other hand, a material liquid may be ejected on a single surface of the substrate 10 transferred. In this case, a film 11 is formed only on one surface of the substrate 1. In one example, a voltage may be applied by the above-described power supply source to either a supply source of a material liquid to the spinning head 31 or a supply path of a material liquid provided between the supply source and the spinning head 31, and the material liquid may be thereby electrified. Also in this case, the electrified material liquid is ejected against the substrate 10 from each ejection nozzle 33.

In another example, the substrate 10 transferred may be arranged on a collecting body (not shown) in the spinning unit 3. A material liquid may be ejected against the collection body and the substrate 10 from the ejection nozzle 33 of each spinning head 31, as described earlier. Thus, a film 11 of organic fiber is formed on the surface of the substrate 10 arranged on the collecting body. In this case, even if the substrate 10 has electrically insulating properties, it is possible to form a film 11 on the surface of the substrate 10. In the spinning unit 3, the formation of the organic fiber film 11 on the surface of the substrate 10 may be achieved with a method other than an electrospinning method. In one example, an organic fiber film 11 is formed on the surface of the substrate 10 with an ink jet method, a jet dispenser method, or a spray application method, instead of an electrospinning method. Also in this case, in the spinning unit 3, a material liquid in which an organic substance is dissolved in a solvent is ejected against the surface of the substrate 10.

The winding unit (winding apparats) 4 includes a winding core 41. The winding core 41 is constituted by a reel, for example. The winding core 41 has a central axis C0, and the band-shaped structure 12 that has been transferred through the transfer path P is introduced into the winding core 41. The direction along the central axis C0 of the winding core 41 corresponds to, or approximately corresponds to, a first direction of the transfer path P (the width direction). In the winding unit 4, the driving of a driving member (not shown) such as a motor causes the winding core 41 to rotate in the direction of Arrow R2, and this leads the band-shaped structure 12 that has been introduced into the winding core 41 from the transfer path P to be wound around the outer periphery of the winding core 41. The band-shaped structure 12 is wound around the winding core 41 into a roll with the central axis C0 of the winding core 41 being a center. The band-shaped structure 12 is wound around the winding core 41 in a state where the width direction of the substrate 10 (band-shaped structure 12) corresponds to, or approximately corresponds to, the direction along the central axis C0 of the winding core 41 and where the longitudinal direction of the substrate 10 (band-shaped structure 12) is along the circumferential direction of the winding core 41.

Figure 2:
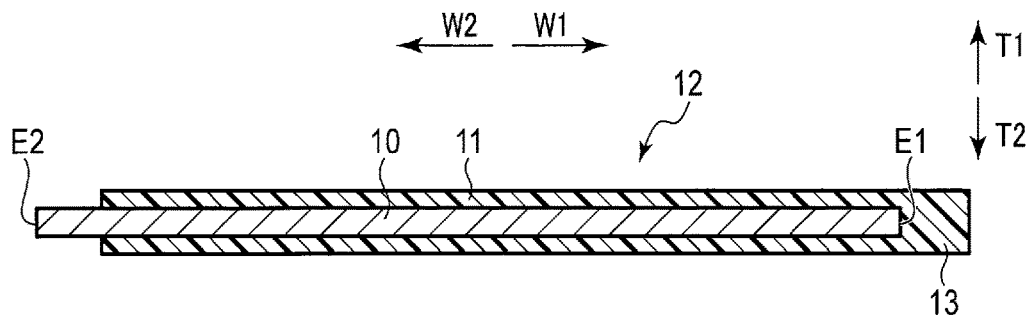
FIG. 2 is a schematic diagram showing an example of a band-shaped structure wound around a winding core in a winding unit according to a first embodiment.

FIG. 2 shows an example of the band-shaped structure 12 (slated to be) wound around the winding core 41. FIG. 2 shows the band-shaped structure 12 viewed in a cross section perpendicular to, or approximately perpendicular to, the longitudinal direction. In FIG. 2, the direction indicated by Arrow W1 and Arrow W2 is a width direction of the band-shaped structure 12 (substrate 10), and the direction indicated by Arrow T1 and Arrow T2 is a thickness direction of the band-shaped structure 12 (substrate 10). As shown in FIG. 2, etc., the substrate 10 includes a pair of edges E1 and E2 in the band-shaped structure 12. In the substrate 10, the edge E1 (first edge) is an edge on one side of the width direction, and the edge E2 (second edge) is an edge opposite to the edge E1 in the width direction. In the substrate 10, the edges E1 and E2 constitute a pair of long-side edges along the longitudinal direction.

In the band-shaped structure 12 of the example shown in FIG. 2, etc., a film 11 is formed on both surfaces of the substrate 10, namely a pair of main surfaces of the substrate 10. Furthermore, in the band-shaped structure 12 (slated to be) wound around the winding core 41, an edge E1 of the substrate 10 on one side in the width direction is covered by the film 11. Therefore, the edge-coating part 13 covering the edge E1 of the substrate 10 is formed in the film 11 of the band-shaped structure 12. In other words, the band-shaped structure 12 comprises the substrate 10 and the edge-coating part 13. The edge-coating part 13 is coated with a material liquid, that is ejected from the ejection nozzle 33, on the surface of the substrate 10. In the present embodiment, the edge-coating part 13 is a part covering the edge E1 in the film 11, which is formed by ejecting the material liquid from the ejection nozzle 33 on the surface of the substrate 10 including the edge E1 in the width direction. The edge-coating part 13 of the film 11 protrudes from the edge E1 of the substrate 10 toward the outside of the band-shaped structure 12 (substrate 10) in regard to the width direction. In the example shown in FIG. 2, etc., no film 11 is formed in the edge E2 on the side opposite to the edge E1 in the substrate 10. For this reason, the edge E2 is not covered by the film 11 and is exposed. Thus, the band-shaped structure 12 is introduced into the winding core 41, with the edge E1 of the substrate 10 being covered by the film 11 and the edge E2 of the substrate 10 not covered by the film 11.

In one example, in the spinning unit 3, the film 11 is formed in such a manner that the film 11 covers both of the edges E1 and E2 of the substrate 10. In this case, a stripping unit (not shown) is provided between the spinning unit 3 and the winding unit 4 in the transfer path P. The stripping unit strips off a part of the film 11 formed by the spinning unit 3 from the substrate 10, using a rotational brush, for example. At this time, in the edge E2 of the substrate 10 and the vicinity thereof, the stripping unit strips off the film 11 of the substrate 10, rendering the edge E2 uncovered. Even in the band-shaped structure 12 subjected to stripping by the stripping unit, the edge E1 and the vicinity thereof are maintained to be covered by the film 11. After the film 11 is partially stripped off as described, the band-shaped structure 12 is introduced into the winding core 41.

In another example, the above-mentioned stripping unit is not provided. In this case, the ejection range of a material liquid from each spinning head 31 is adjusted in the spinning unit 3, in such a manner that a material liquid is not ejected toward the edge E2 of the substrate 10 being transferred and the vicinity thereof. With this adjustment, the film 11 is formed on the surface of the substrate 10 in such a manner that the edge E1 is covered by the film 11 and the edge E2 is not covered by the film 11.

Figure 3:
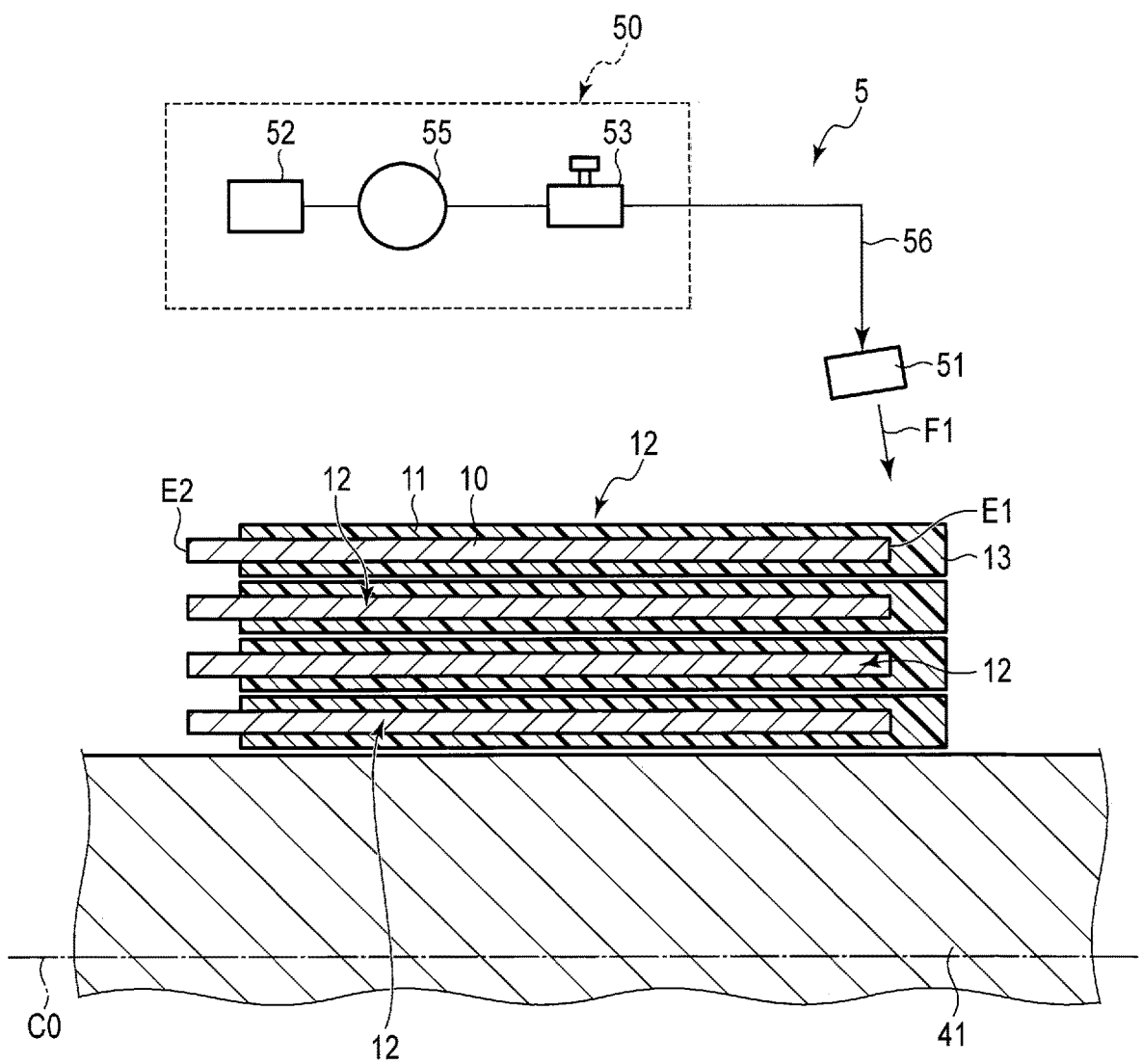
FIG. 3 is a schematic diagram showing a nozzle and an air supply unit in the winding unit according to the first embodiment.

In one example, an electrode (positive electrode or negative electrode) is the substrate 10, and a separator as the film 11 of organic fiber is formed on the surface of the substrate 10. In this case, an electrode (positive electrode or negative electrode) integrated with a separator is formed as the band-shaped structure 12. In each electrode group such as a battery or capacitor, etc., the positive electrode and the negative electrode are electrically insulated from each other by the separator. In the case where the substrate 10 is an electrode, the electrode (substrate 10) includes a current collector and an active material containing layer supported on the surface of a current collector. Furthermore, in the electrode, which is the substrate 10, the current collector and the active material containing layer are formed up to the edge E1 of one side in the width direction. In the electrode, however, the current collector does not support the active material containing layer in the edge E2 on the side opposite to the edge E1 and the vicinity of the edge E2. Thus, in the electrode, the part that does not support the active material containing layer constitutes the edge E2. The substrate 10 is not limited to an electrode. As shown in FIG. 1, etc., the winding unit (winding apparatus) 4 includes an air flow controller 5 for adjusting an air flow in the vicinity of the winding core 41 when the band-shaped structures 12 is wound around the winding core 41. The air flow controller 5 has a nozzle 51 and an air supply unit 50 that supplies a gas to the nozzle 51. FIG. 3 schematically shows the nozzle 51 and the air supply unit 50. FIG. 3 partially shows the winding core 41, and the carrying-in position at which the band-shaped structure 12 is introduced into the part where the band-shaped structure 12 is wound around the winding core 41 and the vicinity of the position. FIG. 3 shows a cross section perpendicular to, or approximately perpendicular to, the longitudinal direction of the band-shaped structure 12, and parallel to, or approximately parallel to, the central axis C0 of the winding core 41. As shown in FIG. 3, etc., the air supply unit 50 serves as a source for supplying a gas to the nozzle 51, and includes a gas tank 52, a valve 53, and a regulator 55. The nozzle 51 is connected to the air supply unit 50 via the air supply path 56.

As shown in FIGS. 1 and 3, etc., the nozzle 51 is an ejection nozzle for ejecting a gas supplied from the air supply unit 50 via the air supply path 56. In the air flow controller 5, a gas is ejected from the nozzle 51 during the winding of the band-shaped structure 12 around the winding core 41. The nozzle 51 ejects a gas against the carrying-in position and the vicinity thereof, where the band-shaped structure 12 is introduced into the outer peripheral surface of a part where the band-shaped structure 12 is wound around the winding core 41 (in other words, the position where the band-shaped structure 12 is (slated to be) wound around by the winding core 41). For this reason, a gas is ejected from the nozzle 51 against the part of the band-shaped structure 12 immediately before being introduced into the carrying-in position and the part immediately after being introduced from the carrying-in position on the outer peripheral surface of the wound part of the band-shaped structure 12. At this time, in the carrying-in position and the vicinity thereof where the band-shaped structure 12 is introduced into the part where the band-shaped structure 12 is wound around the winding core 41, a gas is ejected from a nozzle 51 against the edge-coating part 13 of the film 11 covering the edge E1 of the substrate 10. For this reason, in the carrying-in position and the vicinity thereof where the band-shaped structure 12 is introduced into the wound part, an air flow flowing from the nozzle 51 toward the edge-coating part 13 of the film 11 is generated (Arrow F1), and the air flow is adjusted in the vicinity of the edge-coating part 13 and between the nozzle and the edge-coating part 13 of the film 11.

The gas tank 52 can store a gas to be supplied to the nozzle 51. The valve 53 is a slot valve, and a supply amount of a gas to the nozzle 51 is adjusted by the valve 53. An ejection amount of the gas from the nozzle 51 is adjusted by adjusting a supply amount of a gas to the nozzle 51. The pressure of the gas supplied to the nozzle 51 is adjusted by the regulator 55. The ejection pressure of the gas at the nozzle 51 is adjusted by adjusting the pressure of the gas to the nozzle 51. By adjusting the ejection amount and the ejection pressure of the gas at the nozzle 51, the ejection speed of the gas at the nozzle 51 is adjusted. In the present embodiment, the air flow controller 5 adjusts the ejection amount, ejection pressure, and ejection speed of the gas at the nozzle 51 as described above, and the air flow controller 5 thereby adjusts the flow amount, speed, and pressure of an air flow flowing from the nozzle 51 toward the edge-coating part 13 of the film 11, in other words, an air flow between the nozzle 51 and the edge-coating part 13.

Figure 4:
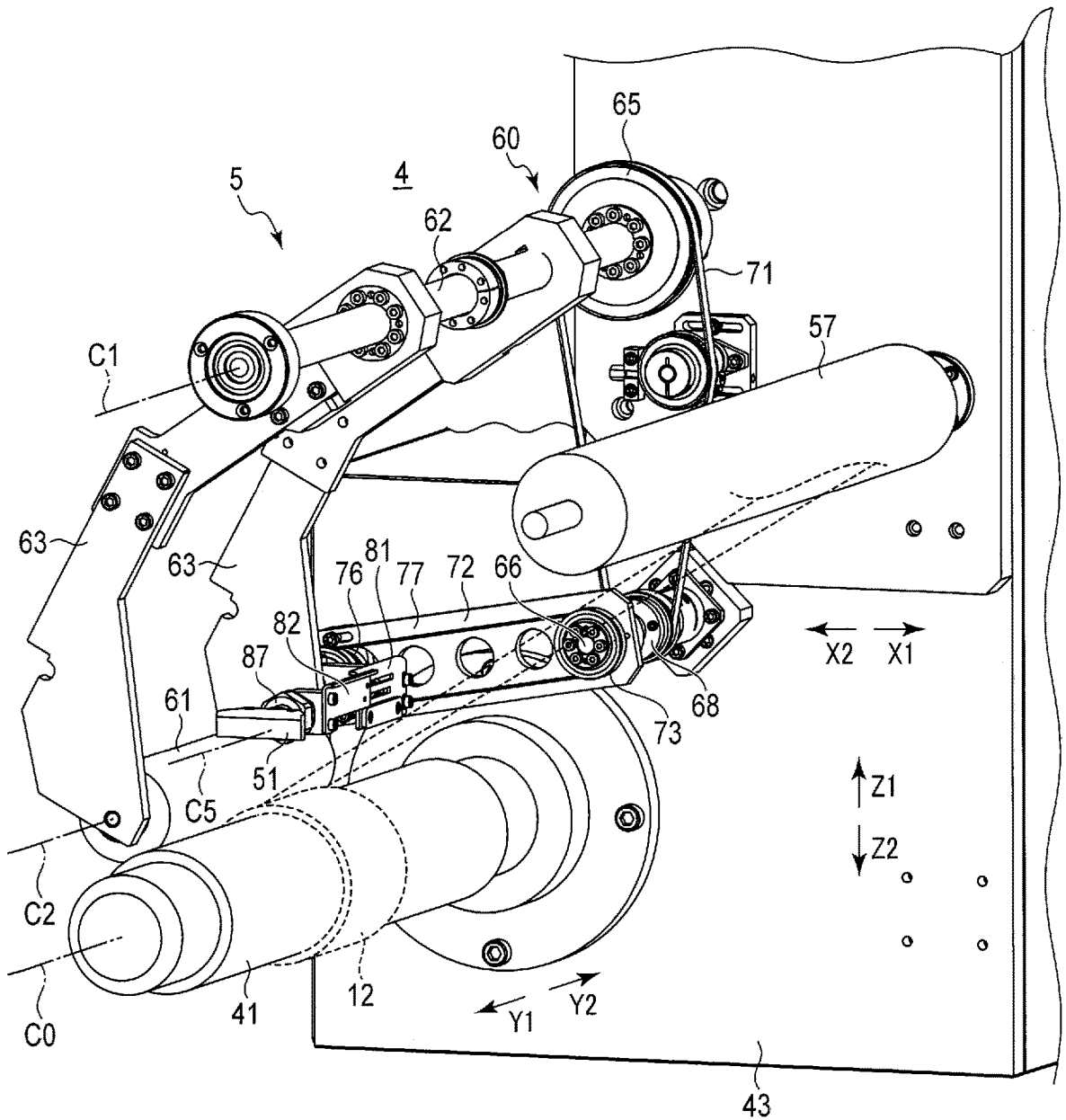
FIG. 4 is a perspective view of the winding core, the nozzle, and the vicinity thereof in the winding unit (winding apparatus) according to the first embodiment.
Figure 6:
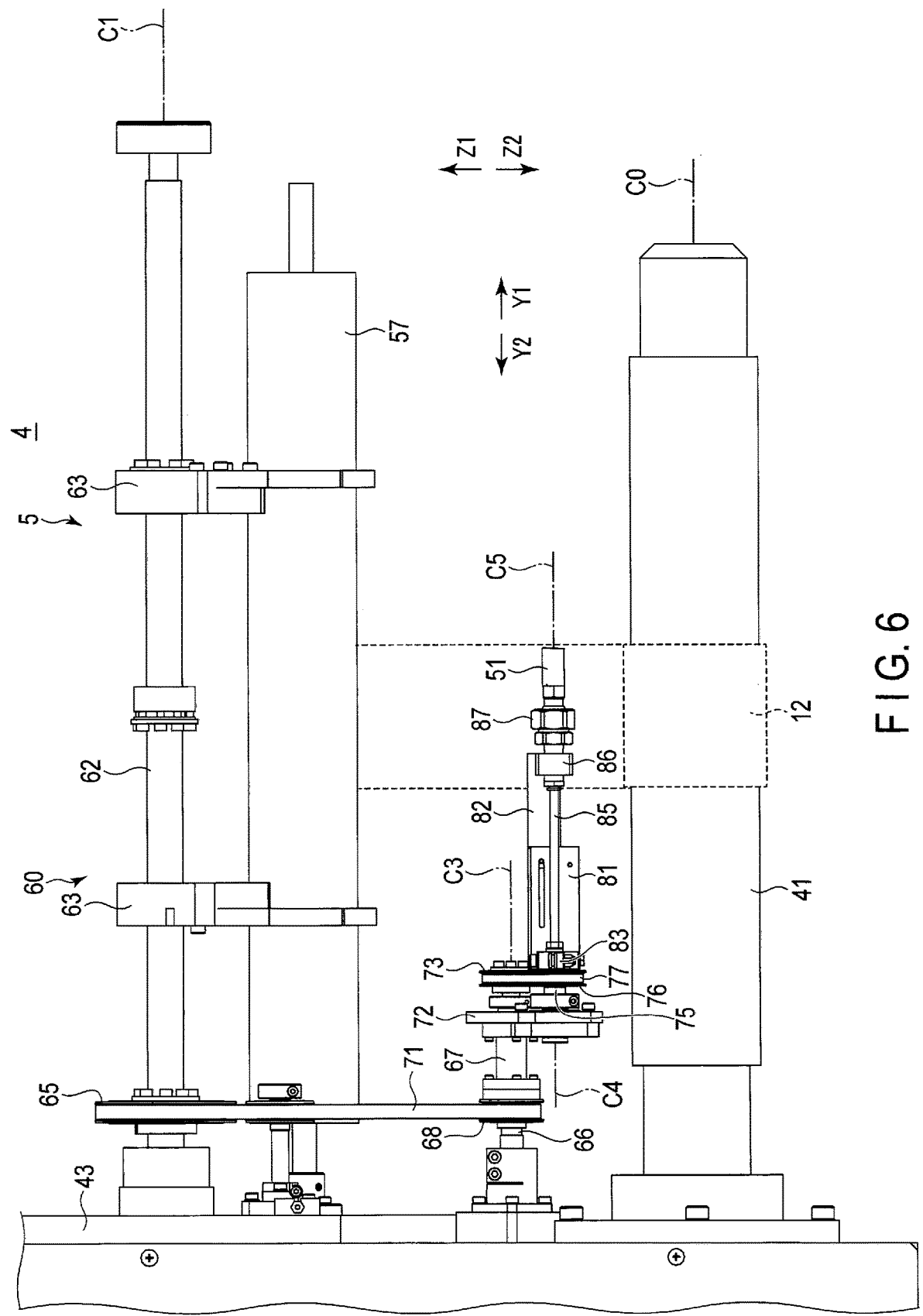
FIG. 6 is a plan view of the winding core, the nozzle, and the vicinity thereof in the winding unit according to the first embodiment, viewed from the side opposite to the side, on which a band-shaped structure is carried in, in a depth direction.

FIGS. 4 to 6 show configurations of the winding core 41, the nozzle 51, and the vicinity thereof in the winding unit (winding apparatus) 4. As shown in FIG. 4 to FIG. 6, in the winding unit 4, a depth direction (the direction indicated by arrows X1 and X2), a transverse direction (the direction indicated by arrows Y1 and Y2) intersecting (orthogonal or approximately orthogonal to) the depth direction, and a height direction (the direction indicated by arrows Z1 and Z2) intersecting (orthogonal or approximately orthogonal to) the depth direction and the transverse direction are defined. The band-shaped structure 12 is introduced to the winding core 41 from one side of the depth direction (the Arrow X1 side). Herein, FIG. 4 is a perspective view, and FIG. 5 shows a state viewed from one side of the transverse direction (the arrow Y1 side). FIG. 6 shows a state viewed from a side opposite to the side where the band-shaped structure 12 is introduced in regard to the depth direction. In FIGS. 4 to 6, the band-shaped structure 12 is shown with a dashed line.

In the winding unit 4, the central axis C0 of the winding core 41 is along a transverse direction. The band-shaped structure 12 is wound around the winding core 41, in a state where the width direction and the transverse direction of the band-shaped structure 12 match or approximately match. In the example shown in FIGS. 4 through 6, a guide roller 57 is arranged at a position close to the winding core 41 in the transfer path P. The band-shaped structure 12 is guided to the winding core 41 by the guide roller 57, and introduced into the winding core 41 from the guide roller 57. In other words, the band-shaped structure 12 is guided through the guide roller 57 to the carrying-in position where the band-shaped structure 12 is introduced to the outer peripheral surface of a part wound around the winding core 41. The guide roller 57 is arranged, in regard to the depth direction, on the side where the band-shaped structure 12 is introduced to the winding core 41, and is arranged on the upper side (the Arrow Z1 side) with respect to the winding core 41 in the height direction. The central axis of the guide roller 57 is along the transverse direction and the width direction of the band-shaped structure 12.

In the winding unit 4, the winding core 41 is attached to the wall unit 43. The winding core 41 is attached to the wall unit 43 from one side of the transverse direction (the Arrow Y1 side). The winding core 41 is rotatable around the central axis C0 with respect to the wall unit 43. The air flow controller 5 adjusts the position and the posture of the nozzle 51. The air flow controller 5 includes a touch roll 61 and a drive force transmitting unit 60 that transmits a drive force from the touch roll 61 to the nozzle 51. The nozzle 51 is coupled to the touch roll 61, with the drive force transmitting unit 60 interposed therebetween.

In the example shown in FIGS. 4 to 6, the drive force transmitting unit 60 includes a rotation shaft 62, a pair of connecting plates 63, timing pulleys 65 and 68, a timing belt 71, a base shaft 66, a rotation cylinder 67, an arm plate 72, timing pulleys 73 and 76, a timing belt 77, a connecting shaft 75, and relaying plates 81 and 82, etc. The rotation shaft 62 has a central axis C1, which is along the transverse direction. The rotation shaft 62 is attached to the wall unit 43 from the side at which the winding core 41 is attached in the transverse direction. The rotation shaft 62 is rotatable around the central axis C1 with respect to the wall unit 43. The rotation shaft 62 is arranged above the winding core 41 in the height direction.

The pair of connecting plates 63 is stationarily fixed to the rotation shaft 62 and the connecting plates 63 are separately arranged in the transverse direction. Each connecting plate 63 extends from the rotation shaft 62 toward the lower side in the height direction, and extends from the rotation shaft 62 toward the winding core 41. Each connecting plate 63 is formed in a bent shape in approximately a shape of a C when viewed from the transverse direction. The touch roll 61 is coupled to the rotation shaft 62, with the connecting plates 63 interposed therebetween. The touch roll 61 has a central axis C2, and the central axis C2 of the touch roll 61 is along the transverse direction. The touch roll 61 is arranged with respect to the wall unit 43 at the side where the winding core 41 is located in the transverse direction. The touch roll 61 is rotatable around the central axis C2 with respect to the connecting plate 63. The touch roll 61 is also rotatable around the central axis C1 of the rotation shaft 62 together with the rotation shaft 62 and the connecting plates 63, with respect to the wall unit 43. FIG. 6 omits a part of each of the connecting plates 63 and the touch roll 61.

The touch roll 61 is in contact with the outer peripheral surface of the wound part of the band-shaped structure 12 around the winding core 41 (namely, the outer peripheral surface of the band-shaped structure 12 wound around the winding core 41). The touch roll 61 touches the wound part around the winding core 41 from the outer peripheral side, and in the example shown in FIGS. 4 through 6, in the vicinity of the nozzle 51, the touch roll 61 touches the outer peripheral surface of the wound part around the winding core 41. The timing pulley 65 is stationarily fixed to the rotation shaft 62 and is located on a side closer to the wall unit 43 than the connecting plates 63, in regard to the transverse direction. The timing pulley 65 is rotatable around the central axis C1 of the rotation shaft 62 together with the rotation shaft 62 and the touch roll 61, etc., with respect to the wall unit 43.

Figure 7:
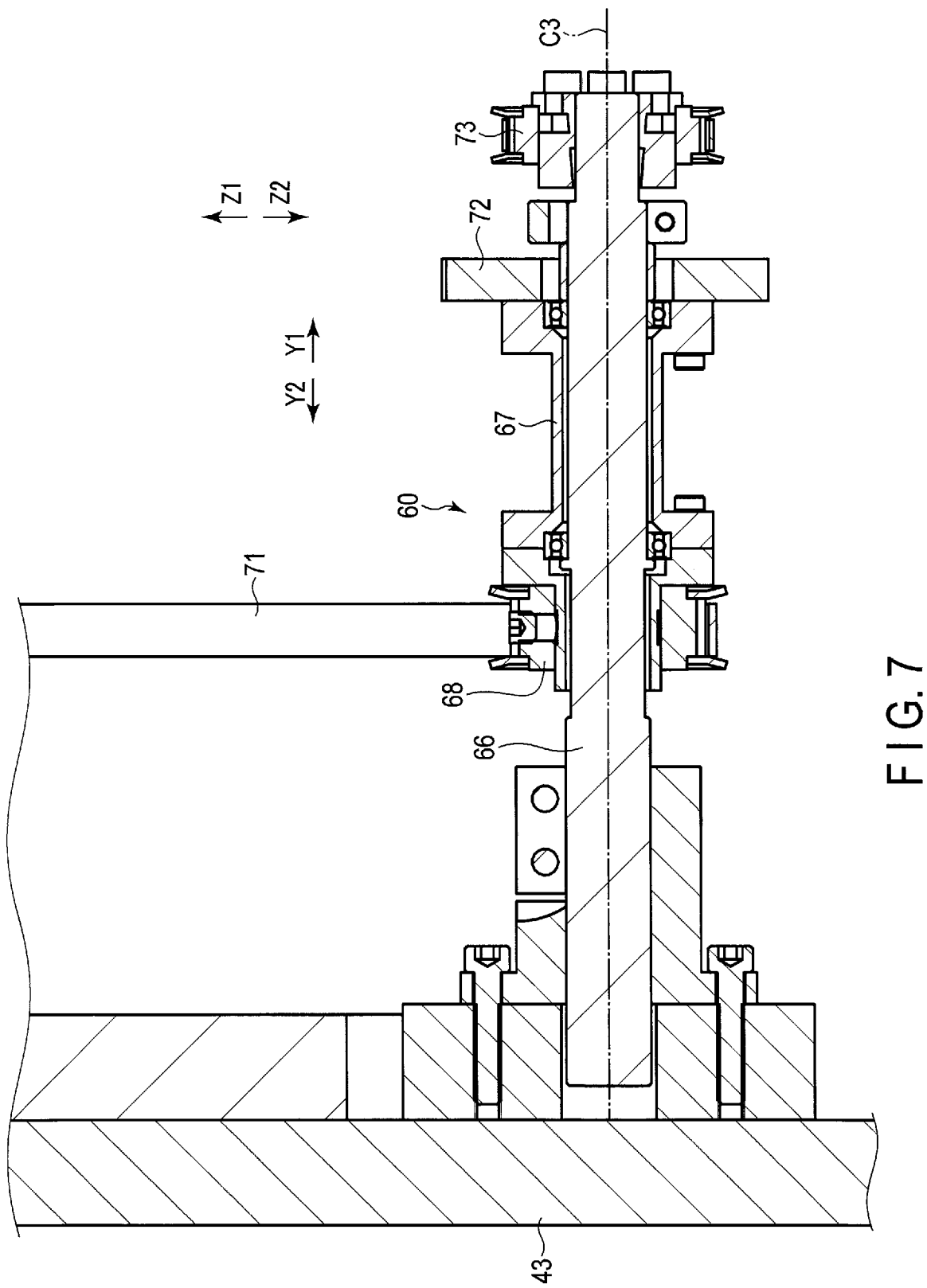
FIG. 7 is a cross-sectional view showing a part of a drive force transmitting unit in the winding unit according to the first embodiment and showing a base shaft and a rotational cylinder, etc. in a cross section perpendicular to, or approximately perpendicular to, a depth direction.
Figure 9:
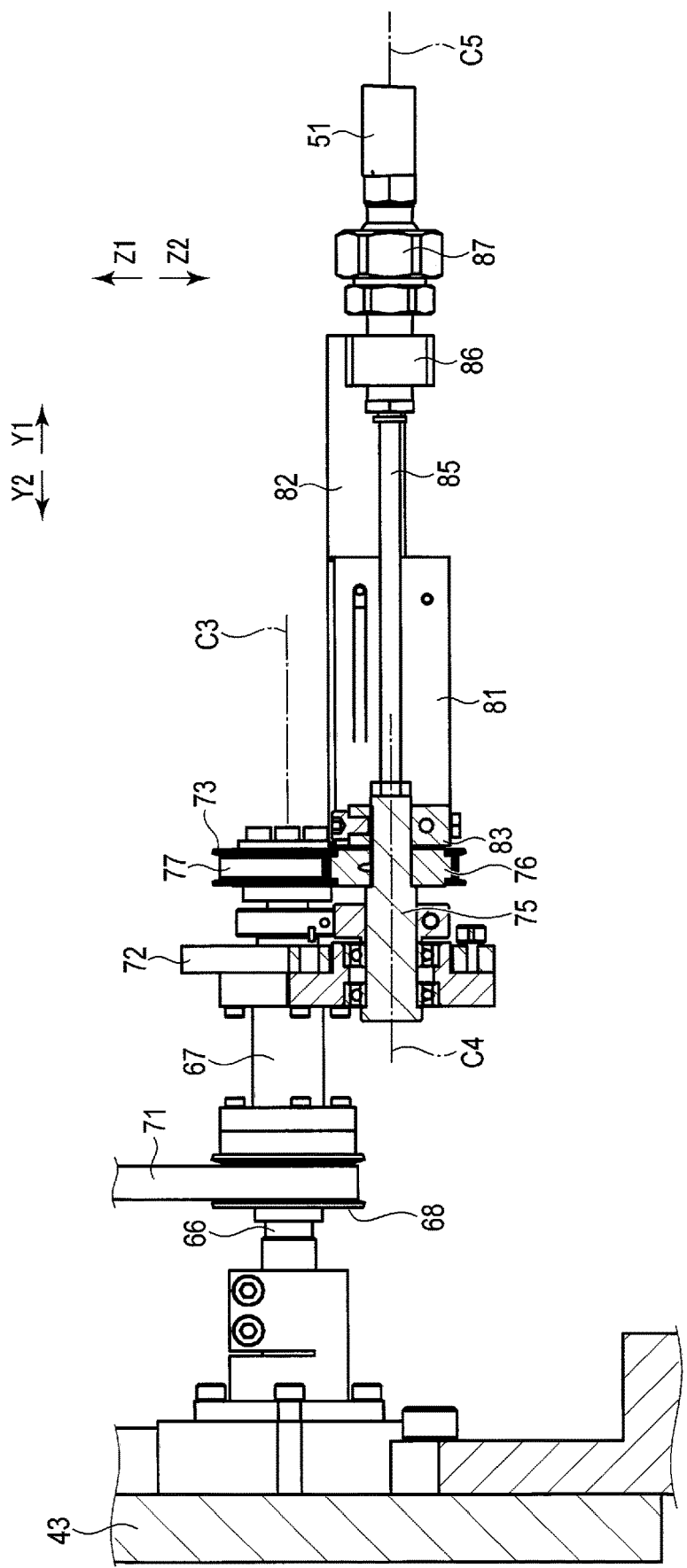
FIG. 9 is a cross-sectional view of the winding core, the nozzle, and the part in the vicinity of the nozzle in the drive force transmitting unit in the winding unit according to the first embodiment, showing a connecting shaft, etc. in a cross section perpendicular to, or approximately perpendicular to, a depth direction.

FIG. 7 shows a part of the drive force transmitting unit 60, and the base shaft 66 and the rotation cylinder 67, etc. in a cross section perpendicular to, or approximately perpendicular to, a depth direction. FIG. 8 is a perspective view showing the winding core 41, the nozzle 51 and the part of the drive force transmitting unit 60 in the vicinity of the nozzle 51. FIG. 8 shows the band-shaped structure 12 with a dashed line. FIG. 9 shows the nozzle 51 and the part in the vicinity of the nozzle 51 in the drive force transmitting unit 60, and the connecting shaft 75, etc. in a cross section perpendicular to, or approximately perpendicular to, the depth direction, and the base shaft 66 and the rotation cylinder 67, etc. viewed from the side opposite to the side from which the band-shaped structure 12 is introduced, in regard to the depth direction.

As shown in FIGS. 4 to 9, the rotation cylinder 67 is attached to the wall unit 43, with the base shaft 66 being interposed therebetween. The rotation cylinder 67 has a central axis C3, and the central axis C3 of the rotation cylinder 67 is coaxial with, or approximately coaxial with, the central axis of the base shaft 66. The central axis C3 of the rotation cylinder 67 is along the transverse direction, and the rotation cylinder 67 is attached to the wall unit 43 from the side where the winding core 41 is attached in the transverse direction. The rotation cylinder 67 (central axis C3) is arranged between the winding core 41 (central axis C0) and the rotation shaft 62 (central axis C1) in the height direction, and is arranged, in regard to the depth direction, on the side where the band-shaped structure 12 is introduced relative to the winding core 41. The rotation cylinder 67 is rotatable around the central axis C3 with respect to the wall unit 43 and the base shaft 66.

The rotation cylinder 67 is stationarily fixed to a timing pulley 68 and an arm plate 72. In this way, the timing pulley 68 and the arm plate 72 are rotatable around the central axis C3 of the rotation cylinder 67, together with the rotation cylinder 67, etc. The timing pulley 68 is located to a side closer to the wall unit 43 than the arm plate 72 in the transverse direction. In the drive force transmitting unit 60, the timing belt 71 is looped over the timing pulleys 65 and 68, and the timing pulley 65 is coupled to the timing pulley 68, with the timing belt 71 interposed. For this reason, when the timing pulley 65 is rotated around the central axis C1 of the rotation shaft 62, the drive force is transmitted from the timing pulley 65 to the timing pulley 68, and the timing pulley 68 rotates around the central axis C3 of the rotation cylinder 67, together with the rotation cylinder 67 and the arm plate 72.

The arm plate 72 extends from the rotation cylinder 67 in the depth direction, toward the side opposite to the side where the band-shaped structure 12 is introduced. In the drive force transmitting unit 60, the connecting shaft 75 is stationarily fixed to the arm plate 72, and the connecting shaft 75 is located, with respect to the rotation cylinder 67 (central axis C3), at the side opposite to the side where the band-shaped structure 12 is introduced in the depth direction. In the drive force transmitting unit 60, the connecting shaft 75 is coupled to the nozzle 51, with the timing pulley 76 and the relaying plates 81 and 82, etc. interposed between the connecting shaft 75 and the nozzle 51. In this manner, when the arm plate 72 rotates around the central axis C3 of the rotation cylinder 67, the connecting shaft 75, the timing pulley 76, the relaying plates 81 and 82, and the nozzle 51, etc. rotate around the central axis C3 of the rotation cylinder 67, together with the arm plate 72, etc.

In the drive force transmitting unit 60, the timing pulley 73 is stationarily fixed to the base shaft 66, and the timing pulley 73 is located further from the wall unit 43 than the timing pulley 68 and the arm plate 72 in the transverse direction. When the rotation cylinder 67 and the arm plate 72, etc. are rotated around the central axis C3 of the rotation cylinder 67 in the above-described manner, the timing pulley 73 does not rotate together with the rotation cylinder 67, etc. The timing pulley 76 has a central axis C4, which is along the transverse direction. The timing pulley 76 is rotatable around the central axis C4 with respect to the arm plate 72 and the connecting shaft 75. The timing pulley 76 (central axis C4) is located at a side opposite to the side where the band-shaped structure 12 is introduced with respect to the rotation cylinder 67 (central axis C3) in the depth direction. The timing pulley 76 is attached to the arm plate 72 from a side opposite to the side where the wall unit 43 is located in the transverse direction, with the connecting shaft 75 interposed between the timing pulley 76 and the arm plate 72.

The timing pulley 76 is coupled to the nozzle 51, with the relaying plates 81 and 82, etc. interposed therebetween. In the drive force transmitting unit 60, the timing belt 77 is looped over the timing pulleys 73 and 76, and the timing pulley 76 is coupled to the timing pulley 73, with the timing belt 77 interposed therebetween. In this manner, when the timing pulley 76 and the nozzle 51, etc. rotate together with the arm plate 72, etc. around the central axis C3 of the rotation cylinder 67, the drive force is transmitted from the timing pulley 73 to the timing pulley 76, and the timing pulley 76, the relaying plates 81 and 82, and the nozzle 51, etc. rotate around the central axis C4 of the timing pulley 76, with respect to the connecting shaft 75 and the aim plate 72, etc.

The relaying plate 81 is connected to the timing pulley 76, and is formed in a shape bent at a bent position. The relaying plate 81 extends from the connection position in the timing pulley 76 to the bent position, toward the side at which the band-shaped structure 12 is introduced in the depth direction. The relaying plate 81 is bent at the bent position, toward the side opposite to the wall unit 43 in the transverse direction. The relaying plate 82 is connected to the part bent toward the side opposite to the wall unit 43 in the relaying plate 81. The relaying plate 82 is attached to the relaying plate 81 from the side opposite to the wall unit 43 in regard to the transverse direction. The nozzle 51 is attached to the relaying plate 82 from the opposite side of the wall unit 43 in the transverse direction. The nozzle 51 and the relaying plate 82 are located between the timing pulley 73 and the timing pulley 76 in the depth direction.

Herein, when the band-shaped structure 12 is wound around the winding core 41, an amount of the wound band-shaped structure 12 around the winding core 41 increases as time elapses. For this reason, a diameter of the wound part of the band-shaped structure 12 around the winding core 41 increases and the distance from the central axis C0 of the winding core 41 to the outer peripheral surface of the wound part increases as time elapses. Moreover, as the diameter of the wound part around the winding core 41 increases, the carrying-in position at which the band-shaped structure 12 is introduced to the outer peripheral surface of the wound part changes, as does the path of the band-shaped structure 12 introduced into the carrying-in position. In the example shown in FIGS. 4 to 6, as the diameter of the wound part increases, the carrying-in position at which the band-shaped structure 12 is introduced into the wound part changes to the upper side in the height direction (the Arrow Z1 side). In this manner, a path of the band-shaped structure 12 from the guide roller 57 to the carrying-in position where the band-shaped structure 12 is introduced to the outer peripheral surface of the wound part also changes.

In the present embodiment, as the diameter of the wound part around the winding core 41 increases, the touch roll 61 that is in contact with the outer peripheral surface of the wound part is moved by a force from the wound part, and the diameter direction position with respect to the winding core 41 changes. As the touch roll 61 moves (in other words, as the change in the diameter direction position with respect to the winding core 41 changes), the rotation shaft 62 and the timing pulley 65, etc. rotate around the central axis C1 of the rotation shaft 62 together with the touch roll 61 (Arrow R3 in FIG. 5). Then, when the timing pulley 65 rotates around the central axis C1 of the rotation shaft 62, the drive force is transmitted from the timing pulley 65 to the timing pulley 68, and the rotation cylinder 67, the arm plate 72, the timing pulley 76, the relaying plates 81 and 82, and the nozzle 51, etc. rotate around the central axis C3 of the rotation cylinder 67 (Arrow R4 in FIG. 5). Then, when the timing pulley 76 and the nozzle 51 rotate together with the arm plate 72, etc. around the central axis C3 of the rotation cylinder 67, the drive force is transmitted from the timing pulley 73 to the timing pulley 76, and the relaying plates 81 and 82 and the nozzle 51, etc. rotate around the central axis C4 of the timing pulley 76 with respect to the arm plate 72, etc. (Arrow R5 in FIG. 5).

As stated above, in the present embodiment, even when the diameter of the part wound around the winding core 41 increases, the drive force generated by the movement of the touch roll 61 is transmitted to the nozzle 51 via the drive force transmitting unit 60. Furthermore, when the nozzle 51 is moved by the transmitted drive force, the position and the posture of the nozzle 51 changes. Herein, when the diameter of the wound part increases, the carrying-in position at which the band-shaped structure 12 is introduced into the wound part and the path of the band-shaped structure 12 introduced into the carrying-in position change in the above-described manner. In the present embodiment, the foregoing touch roll 61 and the drive force transmitting unit 60 are provided in the air flow controller 5; therefore, the air flow controller 5 changes the position and the posture (angle) of the nozzle 51 to follow the changes of the carrying-in position of the band-shaped structure 12 and the path of the band-shaped structure 12 into the carrying-in position as a result of the increase in a diameter of the wound part. In other words, the air flow controller 5 moves the nozzle 51 so as to be in a state where the position and the posture of the nozzle 51 follow the changes of the carrying-in position of the band-shaped structure 12 and the path of the band-shaped structure 12 into the carrying-in position, and thereby adjusts the position and the posture (angle) of the nozzle 51. Thus, in the present embodiment, the air flow controller 5 changes the position and the posture of the nozzle 51 in accordance with the change of the carrying-in position at which the band-shaped structure 12 is wound around the winding core 41.

The relaying plate 82 is attached to the relaying plate 81 in such a manner that the relaying plate 82 is movable in the transverse direction. The nozzle 51 is movable in the transverse direction with respect to the relaying plate 81, etc., together with the relaying plate 82. The air flow controller 5 can adjust the position, etc. of the nozzle 51 by moving the nozzle 51 together with the relaying plate 81 in the transverse direction.

The nozzle 51 is connected to the relaying plate 82 with the ball joint 87 interposed therebetween. For this reason, the nozzle 51 is movable relative to the relaying plate 82, etc. around the rotation axis C5 of the ball joint 87. The rotation axis C5 is along the transverse direction and is located at a lower side in the height direction with respect to the central axis C1 of the rotation shaft 62. The rotation axis C5 is located between the central axis C3 of the rotation cylinder 67 and the central axis C4 of the timing pulley 76 in the depth direction. In the air flow controller 5, the nozzle 51 is rotated around the rotation axis C5 so as to adjust the posture, etc. of the nozzle 51.

In the air flow controller 5 of the present embodiment, the position and the posture of the nozzle 51 is adjusted through the adjustment by the touch roll 61 and the drive force transmitting unit 60, the adjustment by moving the relaying plate 82, the adjustment with the ball joint 87, etc., as described above. The air flow controller 5 adjusts the ejection direction of a gas from the nozzle 51 by adjusting the position and the posture of the nozzle 51. Furthermore, the air flow controller 5 adjusts a direction of an air flow from the nozzle 51 toward the edge-coating part 13 of the film 11, namely the direction of an air flow between the nozzle 51 and the edge-coating part 13, by adjusting the ejection direction of a gas from the nozzle 51.

A joint block 83 is stationarily fixed to the relaying plate 81, and a joint block 86 is stationarily fixed to the relaying plate 82. The pipe 85 connects between the joint blocks 83 and 86. A pipe (not shown) extending from the air supply unit 50 is connected to the joint block 83. The air supply path 56 that supplies a gas from the air supply unit 50 to the nozzle 51 is formed from the air supply unit 50 to the nozzle 51, through the inside of the pipe, the inside of the joint block 83, the inside of the pipe 85, the inside of the joint block 86, and the inside of the ball joint 87, in this order. In the example shown in FIGS. 4 to 9, two openings 58 are formed in the nozzle 51, and the nozzle 51 ejects a gas supplied through the air supply path 56 from each of the openings 58. For this reason, in the present embodiment, each opening 58 of the nozzle 51 serves as an ejection port for ejecting a gas.

In the present embodiment, the air flow controller 5 causes the nozzle 51 to eject a gas when the band-shaped structure 12 is wound around the winding core 41 as described above. In the band-shaped structure 12 wound around the winding core 41, the air flow controller 5 adjusts an air flow between the nozzle 51 and the edge-coating part 13 of the film 11 by the ejection of a gas from the nozzle 51. In this manner, during the winding of the band-shaped structure 12, it is possible to adjust an air flow between the nozzle 51 and the edge-coating part 13 of the film 11 in such a manner that the bends of the edge-coating part 13 of the film 11 to the outer peripheral side of the winding core 41, and the folds of the edge-coating part 13 of the film 11 toward the inside of the width direction of the band-shaped structure 12 (the axial direction of the winding core 41) are suppressed.

In the winding of the band-shaped structure 12, an occurrence of the above-described bends and folds in the edge-coating part 13 of the film 11 can be suppressed, and this allows effective prevention of a bent or folded edge-coating part 13 from getting caught between the outer-peripheral surface of the wound part and a part newly carried into the wound part, for example. In this manner, occurrence of local lumps in the edge-coating part 13 of the film 11 and the vicinity thereof are suppressed in the wound part of the band-shaped structure 12 around the winding core 41. During the winding of the band-shaped structure 12 around the winding core 41, the above-described local lump in the wound part around the band-shaped structure 12 is suppressed, and in turn, a warp, etc. is less likely to occur in the wound band-shaped structure 12 and damages, etc. to the band-shaped structure 12 can be effectively prevented.

Furthermore, in the present embodiment, the air flow controller 5 adjusts the ejection direction, ejection amount, ejection pressure, and ejection speed of a gas from the nozzle 51 as described above, thereby adjusting a direction, flow amount, speed, and pressure of an air flow between the nozzle 51 and the edge-coating part 13. By adjusting the direction, flow amount, speed, and pressure of an air flow between the nozzle 51 and the edge-coating part 13, it is possible to more appropriately suppress occurrence of the above-described bends and folds in the edge-coating part 13 of the film 11 during the winding of the band-shaped structure 12. It is thereby possible to more appropriately suppress occurrence of the above-described local lump in the wound part of the band-shaped structure 12.

Furthermore, in the present embodiment, the air flow controller 5 changes the position and posture of the nozzle 51 by making the nozzle 51 follow the changes in the carrying-in position of the band-shaped structure 12 and the path of the band-shaped structure 12 due to an increase in the diameter of the part wound around the winding core 41. For this reason, even when the carrying-in position of the band-shaped structure 12 to the wound part and the path of the band-shaped structure 12 into the carrying-in position may change as described above, a gas is appropriately ejected from the nozzle 51 toward the carrying-in position of the band-shaped structure 12 to the wound part and the vicinity thereof. Thus, even if the carrying-in position of the band-shaped structure 12 to the wound part and the path of the band-shaped structure 12 into the carrying-in position change as the diameter of the wound part around the winding core 41 increases, an air flow is appropriately adjusted in the carrying-in position of the band-shaped structure 12 into the wound part and the vicinity thereof. It is thereby possible to more appropriately suppress occurrences of the above-described bends and folds, etc. in the edge-coating part 13 of the film 11 and to more appropriately suppress occurrences of the above-described local lump in the wound part of the band-shaped structure 12.

In the present embodiment, the touch roll 61 touches the outer peripheral surface of the wound part of the band-shaped structure 12 around the winding core 41, and moves as the diameter of the wound part around the winding core 41 increases. The drive force generated by the movement of the touch roll 61 is transmitted to the nozzle 51 by the drive force transmitting unit 60, and the position and the posture of the nozzle 51 are thereby made to follow the changes of the carrying-in position of the band-shaped structure 12 and the path of the band-shaped structure 12 into the carrying-in position. For this reason, the structure of changing the position and the posture of the nozzle 51 by making the nozzle 51 follow the changes of the carrying-in position of the band-shaped structure 12 and the path of the band-shaped structure 12 into the carrying-in position is suitably realized by the touch roll 61 and the drive force transmitting unit 60.

To verify the embodiment, etc., a gas was ejected from the nozzle 51 toward the edge-coating part 13 of the film 11 during the winding of the band-shaped structure 12. After the winding of the band-shaped structure 12 was completed, a height of a local lump in the edge-coating part 13 and the vicinity thereof was measured in the wound part around the winding core 41. In the verification, a lump was more suppressed by the ejection of a gas from the nozzle 51 toward the edge-coating part 13 of the film 11, compared to the case where a gas was not ejected against the edge-coating part 13. With the ejection of a gas from the nozzle 51 toward the edge-coating part 13 of the film 11, in the part wound around the winding core 41, the height of the local lump appeared in the edge-coating part 13 and the vicinity thereof was suppressed to an extent that it would not damage the band-shaped structure 12 (substrate 10).

(Modifications)

The drive force transmitting unit 60 that transmits the drive force generated as a result of the movement of the touch roll 61 is not limited to the configuration according to the foregoing embodiment, etc. In one modification, a parallel link mechanism is provided instead of the timing pulleys 73 and 76 and the timing belt 77, etc., and the timing pulley 68 is coupled to the nozzle 51 with the parallel link mechanism interposed therebetween. In another modification, a parallel link mechanism extends from the rotation shaft 62 toward a lower side in a height direction, and the rotation shaft 62 is coupled to the nozzle 51 with the parallel link mechanism interposed therebetween. In this case, the nozzle 51 is rotatable around the central axis C1 of the rotation shaft 62, together with the rotation shaft 62. In any of the modifications, however, the drive force transmitting unit 60 transmits the drive force from the touch roll 61 to the nozzle 51 and thereby changes the position and the posture of the nozzle 51 so as to follow the changes of the carrying-in position of the band-shaped structure 12 and the path of the band-shaped structure 12 as a result of the increase in the diameter of the wound part around the winding core 41.

The structure for adjusting the ejection direction, ejection amount, ejection pressure, and ejection speed of a gas from the nozzle 51 is not limited to those in the foregoing embodiment, etc. It suffices that the direction, flow amount, speed, and pressure of an air flow between the nozzle 51 and the edge-coating part 13 are adjusted when the air flow controller 5 adjusts the ejection direction, ejection amount, ejection pressure, and ejection speed of the gas at the nozzle 51.

Figure 10:
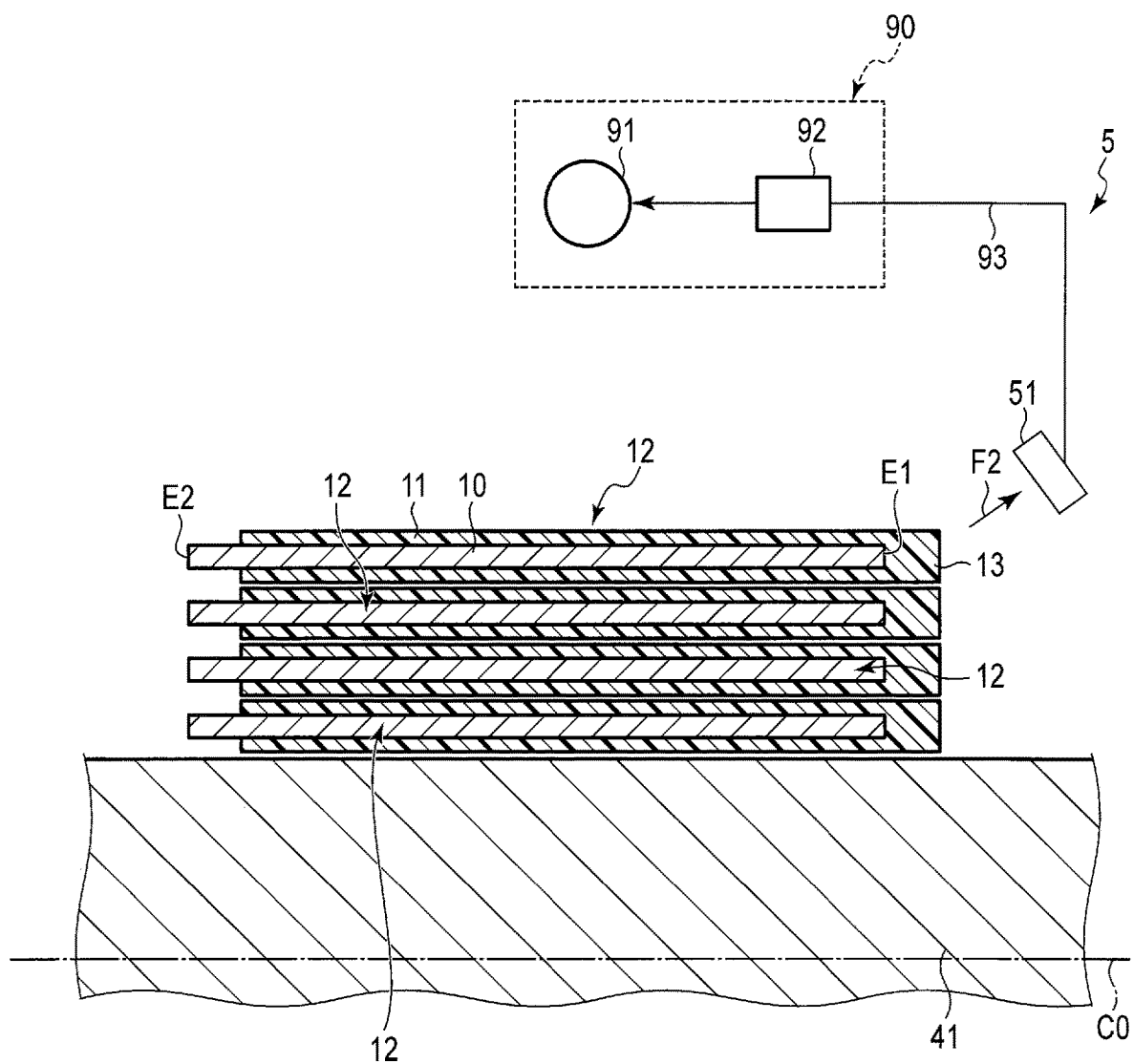
FIG. 10 is a schematic view of a nozzle and a suction source unit in a winding unit according to a modification.

In the particular modification shown in FIG. 10, the nozzle 51 suctions a gas, instead of ejecting it. In this modification, the air flow controller 5 has a suction source unit 90 to cause the nozzle 51 to perform suction instead of the air supply unit 50, and the nozzle 51 is a suction nozzle for suctioning. FIG. 10 schematically shows the nozzle 51 and the suction source unit 90. FIG. 10 partially shows the winding core 41, and the carrying-in position at which the band-shaped structure 12 is introduced into the part where the band-shaped structure 12 is wound around the winding core 41 and the vicinity of the position. FIG. 10 shows a cross section perpendicular to, or approximately perpendicular to, the longitudinal direction of the band-shaped structure 12, and parallel to, or approximately parallel to, the central axis C0 of the winding core 41. As shown in FIG. 10, etc., the suction source unit 90 has a suction drive unit 91 and an accumulation unit 92. In the present modification, the nozzle 51 is connected to the suction source unit 90 via the suction path 93.

A suction pump and a blower, etc. may be used as the suction drive unit 91. By driving the suction drive unit 91, the nozzle 51 suctions a gas, etc. from the above-described opening 58, etc. serving as a suction port. The gas, etc. suctioned from the nozzle 51 goes to the suction source unit 90 through the suction path 93. A filter, etc. is provided in the accumulation unit 92 of the suction source unit 90 so as to accumulate powdery objects, etc. suctioned together with the gas. The inflow of the powdery objects, etc. into the suction drive unit 91 can be prevented by the accumulation unit 92.

In the air flow controller 5 of the present modification, the nozzle 51 performs suction during the winding of the band-shaped structure 12 around the winding core 41. The nozzle 51 suctions a gas, etc. at the vicinity of the carrying-in position at which the band-shaped structure 12 is introduced into the outer peripheral surface of the wound part of the band-shaped structure 12 around the winding core 41. At this time, in the carrying-in position and the vicinity thereof where the band-shaped structure 12 is introduced into the part wound around the winding core 41, a suction force acts in a direction from the edge-coating part 13 of the film 11 that covers the edge E1 of the substrate 10 toward the nozzle 51. For this reason, in the carrying-in position and the vicinity thereof where the band-shaped structure 12 is introduced into the wound part, an air flow flowing from the edge-coating part of the film 11 toward the nozzle 51 is generated (Arrow F2), and an air flow between the nozzle 51 and the edge-coating part 13 of the film 11 is thereby adjusted.

In the present modification, the suction amount, suction pressure, and suction speed of the gas at the nozzle 51 are adjusted by adjusting the driving state of the suction drive unit 91. Similarly to the foregoing embodiment, etc., the suction direction of the gas at the nozzle 51 is adjusted by adjusting the position and the posture of the nozzle 51. In the present modification, the air flow controller 5 adjusts the suction direction, suction amount, suction pressure, and suction speed of the gas at the nozzle 51 as described above, and the air flow controller 5 thereby adjusts the direction, flow amount, speed, and pressure of an air flow from the edge-coating part 13 of the film 11 toward the nozzle 51, in other words, an air flow between the nozzle 51 and the edge-coating part 13.

In the present modification, in the band-shaped structure 12 wound around the winding core 41, the air flow controller 5 adjusts an air flow between the nozzle 51 and the edge-coating part 13 of the film 11 by suction at the nozzle 51. Thus, in the present modification, during the winding of the band-shaped structure 12, it is possible to adjust an air flow between the nozzle 51 and the edge-coating part 13 of the film 11 in such a manner that bends of the edge-coating part 13 of the film 11 to the outer peripheral side of the winding core 41, and folds of the edge-coating part 13 of the film 11 toward the inside of the width direction of the band-shaped structure 12 (the axial direction of the winding core 41) are suppressed. For this reason, in the present modification, occurrences of local lumps in the edge-coating part 13 of the film 11 and the vicinity thereof are suppressed in the wound part of the band-shaped structure 12 around the winding core 41.

Similarly to the foregoing embodiment, etc. the touch roll 61 and the drive force transmitting unit 60 may be provided in the present modification. In this case, similarly to the foregoing embodiment, etc., the air flow controller 5 changes the position and posture (angle) of the nozzle 51 by making the nozzle 51 follow the changes in the carrying-in position of the band-shaped structure 12 and the path of the band-shaped structure 12 due to an increase in the diameter of the part wound around the winding core 41. For this reason, even when the carrying-in position of the band-shaped structure 12 to the wound part and the path of the band-shaped structure 12 into the carrying-in position may change as described above, suction is appropriately performed by the nozzle 51 in the carrying-in position of the band-shaped structure 12 to the wound part and the vicinity thereof. Thus, even if the carrying-in position of the band-shaped structure 12 to the wound part and the path of the band-shaped structure 12 into the carrying-in position change as the diameter of the wound part around the winding core 41 increases, an air flow is appropriately adjusted in the carrying-in position of the band-shaped structure 12 into the wound part and the vicinity thereof.

In one modification, the nozzle 51 may perform both ejection and suction of a gas. In this case, in the band-shaped structure 12 wound around the winding core 41, the air flow controller 5 adjusts an air flow between the nozzle 51 and the edge-coating part 13 of the film 11 by the ejection and suctioning of a gas by the nozzle 51. The number of the nozzle 51 is not limited to one; in one modification, a plurality of the nozzles 51 may be provided. In this case, one nozzle 51 may adjust an air flow between the nozzle 51 and the edge-coating part 13 of the film 11 by ejecting a gas, and another nozzle 51 may adjust an air flow between the nozzle 51 and the edge-coating part 13 of the film 11 by suctioning a gas. In these modifications, during the winding of the band-shaped structure 12, it is possible to adjust an air flow between the nozzle 51 and the edge-coating part 13 of the film 11 in such a manner that the bends of the edge-coating part 13 of the film 11 to the outer peripheral side of the winding core 41, and the folds of the edge-coating part 13 of the film 11 toward the inside of the width direction of the band-shaped structure 12 (the axial direction of the winding core 41) are suppressed. Accordingly, the operations and advantageous effects similar to those of the foregoing embodiment, etc. are achieved in the modifications.

In the foregoing embodiment, etc., an electrode integrated with a separator is given as an example of the band-shaped structure 12; however, the band-shaped structure 12 is not limited to this example. In the band-shaped structure 12 in a modification, both edges E1 and E2 of the substrate 10 in the width direction are covered by the film 11. Therefore, the edge-coating part 13 that covers the edge E1 of the substrate 10 and the edge-coating part 13 that covers the edge E2 of the substrate 10 are formed on the film 11 of the band-shaped structure 12. In the present modification, similarly to the foregoing embodiment, etc., an air flow between the nozzle 51 and each edge-coating part 13 of the film 11 is adjusted by at least one of the ejection of a gas from the nozzle 51 or the suction by the nozzle 51. For this reason, the operations and advantageous effects similar to those of the foregoing embodiment, etc. are achieved in the present modification. Therefore, in the band-shaped structure 12, it suffices that at least one of both edges E1 or E2 of the substrate 10 in the width direction is covered by the edge-coating part 13 of the film 11.

According to at least one of the foregoing embodiment or modifications, a nozzle that performs at least either ejection or suction of a gas is provided, and an air flow in the vicinity of the edge-coating part of a film of a belt-shaped structure, which is wound by a winding core, is adjusted. It is thereby possible to provide a winding apparatus, a spinning apparatus, and a method of winding a band-shaped structure that are capable of suppressing mismatching when the band-shaped structure in which the edges of the substrate are covered by the edge-coating part of the film is wound and improving quality of the winding.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A winding apparatus comprising:
    a winding core configured to wind a band-shaped structure, the band-shaped structure comprising a substrate and an edge-coating part coated with a film on a surface of the substrate, the edge-coating part covering an edge in a width direction of the substrate; and
    an air flow controller configured to adjust an air flow in the vicinity of the edge-coating part of the band-shaped structure wound around the winding core, the air flow controller comprising a nozzle configured to perform at least one of ejection or suction of a gas, the nozzle being configured to eject the gas against a carrying-in position of the band-shaped structure and a vicinity thereof and/or configured to suction the gas at the vicinity of the carrying-in position of the band-shaped structure, the band-shaped structure being introduced, at the carrying-in position, into an outer peripheral surface of a wound part of the band-shaped structure around the winding core.

2. The winding apparatus of claim 1, wherein the air flow controller adjusts one or more of a direction, a flow amount, a speed, or a pressure of the air flow between the nozzle and the edge-coating part of the film.

3. The winding apparatus of claim 1, wherein the air flow controller changes a position and a posture of the nozzle in accordance with a change in the carrying-in position at which the band-shaped structure is introduced into the outer peripheral surface of the wound part around the winding core.

4. The winding apparatus of claim 3, wherein
    the air flow controller comprises:
        a touch roll that touches the outer peripheral surface of the wound part of the band-shaped structure around the winding core; and
        a drive force transmitting unit configured to change the position and the posture of the nozzle in accordance with a diameter direction position of the touch roll with respect to the winding core.

* * * * *